United States Patent
Ando et al.

(10) Patent No.: US 10,377,257 B2
(45) Date of Patent: Aug. 13, 2019

(54) VEHICLE-MOUNTED CHARGING DEVICE AND VEHICLE CHARGING SYSTEM

(71) Applicants: Hiroya Ando, Toyota (JP); Ryuichi Kamaga, Nissin (JP); Nobuyuki Nakagawa, Miyoshi (JP); Yuta Ochiai, Toyota (JP); Yukihiro Miyashita, Toyota (JP); Takeshi Hagihara, Osaka (JP); Yoshikazu Isoyama, Yokkaichi (JP)

(72) Inventors: Hiroya Ando, Toyota (JP); Ryuichi Kamaga, Nissin (JP); Nobuyuki Nakagawa, Miyoshi (JP); Yuta Ochiai, Toyota (JP); Yukihiro Miyashita, Toyota (JP); Takeshi Hagihara, Osaka (JP); Yoshikazu Isoyama, Yokkaichi (JP)

(73) Assignees: TOYOTA JIDOSHA KABUSHIKI KAISHA, Aichi-Ken (JP); SUMITOMO ELECTRIC INDUSTRIES, LTD., Itami-shi, Hyogo (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 357 days.

(21) Appl. No.: 14/759,777

(22) PCT Filed: Dec. 27, 2013

(86) PCT No.: PCT/IB2013/002873
§ 371 (c)(1),
(2) Date: Jul. 8, 2015

(87) PCT Pub. No.: WO2014/108726
PCT Pub. Date: Jul. 17, 2014

(65) Prior Publication Data
US 2015/0352969 A1    Dec. 10, 2015

(30) Foreign Application Priority Data

Jan. 9, 2013   (JP) .................................. 2013-002155

(51) Int. Cl.
*B60L 11/18*    (2006.01)
*H02J 13/00*    (2006.01)

(52) U.S. Cl.
CPC ....... *B60L 11/1838* (2013.01); *B60L 11/1818* (2013.01); *B60L 11/1825* (2013.01);
(Continued)

(58) Field of Classification Search
CPC .................................................. B60L 11/1838
(Continued)

(56) References Cited

U.S. PATENT DOCUMENTS

| 7,471,066 B2 * | 12/2008 | Ambrosio | H02J 7/0014 |
| | | | 320/110 |
| 7,934,036 B2 * | 4/2011 | Conti | G06F 13/24 |
| | | | 710/261 |

(Continued)

FOREIGN PATENT DOCUMENTS

| EP | 1 316 132 B1 | 1/2009 |
| EP | 2 442 428 A1 | 4/2012 |

(Continued)

OTHER PUBLICATIONS

Communication dated Feb. 11, 2016 from U.S. Patent & Trademark Office in U.S. Appl. No. 14/374,555.

*Primary Examiner* — Jerry D Robbins
(74) *Attorney, Agent, or Firm* — Sughrue Mion, PLLC

(57) ABSTRACT

A vehicle-mounted charging device (12) includes a vehicle-mounted battery (18), a vehicle-mounted electronic control unit (30) and a modem startup control unit. The vehicle-mounted battery is charged with power supplied from external charging equipment via a charging cable (16). The (Continued)

vehicle-mounted electronic control unit is configured to perform charging communication, relating to charging of the vehicle-mounted battery, with the external charging equipment using an in-band modem (32). The modem startup control unit starts up the in-band modem when the vehicle-mounted electronic control unit performs the charging communication, and that stops a startup of the in-band modem when the vehicle-mounted electronic control unit does not perform the charging communication.

6 Claims, 2 Drawing Sheets

(52) U.S. Cl.
CPC ....... *B60L 11/1846* (2013.01); *B60L 11/1868* (2013.01); *H02J 13/002* (2013.01); *B60L 2230/12* (2013.01); *B60L 2230/16* (2013.01); *B60L 2240/547* (2013.01); *Y02E 60/7815* (2013.01); *Y02T 10/7005* (2013.01); *Y02T 10/7066* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01); *Y04S 40/121* (2013.01)

(58) Field of Classification Search
USPC ........................................................ 320/109
See application file for complete search history.

(56) References Cited

U.S. PATENT DOCUMENTS

| | | | |
|---|---|---|---|
| 8,896,434 B2 | 11/2014 | Ichikawa | |
| 2009/0251300 A1* | 10/2009 | Yasuda | B60L 11/1816 340/426.1 |
| 2010/0001687 A1* | 1/2010 | Watanabe | B60L 3/12 320/109 |
| 2010/0045450 A1 | 2/2010 | Suzuki et al. | |
| 2011/0022256 A1* | 1/2011 | Asada | B60L 11/1824 701/22 |
| 2011/0156642 A1 | 6/2011 | Noguchi et al. | |
| 2011/0204849 A1* | 8/2011 | Mukai | B60L 3/0069 320/111 |
| 2012/0074903 A1* | 3/2012 | Nakashima | B60L 11/1816 320/109 |
| 2012/0098488 A1 | 4/2012 | Ichikawa | |
| 2012/0187905 A1* | 7/2012 | Kanayama | H04B 3/54 320/109 |
| 2013/0029595 A1* | 1/2013 | Widmer | H04B 5/0031 455/39 |
| 2014/0253036 A1 | 9/2014 | Kinomura | |
| 2014/0333262 A1 | 11/2014 | Ochiai et al. | |

FOREIGN PATENT DOCUMENTS

| | | |
|---|---|---|
| JP | 07-240705 A | 9/1995 |
| JP | 2006-262570 A | 9/2006 |
| JP | 2008-279938 A | 11/2008 |
| JP | 2009-83724 A | 4/2009 |
| JP | 2010-93891 A | 4/2010 |
| JP | 2010-288317 A | 12/2010 |
| JP | 2011-125186 A | 6/2011 |
| JP | 2011-523304 A | 8/2011 |
| JP | 2012-124996 A | 6/2012 |
| JP | 2013-143817 A | 7/2013 |
| WO | 2010/005660 A2 | 1/2010 |
| WO | 2010/143482 A1 | 12/2010 |
| WO | 2013/111311 A1 | 8/2013 |

\* cited by examiner

VEHICLE-MOUNTED CHARGING DEVICE AND VEHICLE CHARGING SYSTEM

BACKGROUND OF THE INVENTION

Field of the Invention

The invention relates to a vehicle-mounted charging device and a vehicle charging system. In particular, the invention relates to a vehicle-mounted charging device and a vehicle charging system suitable for reducing consumption of power caused by a startup of a modem that is necessary for charging communication between a vehicle-mounted electronic control unit and external charging equipment, during charging of a vehicle-mounted battery.

Description of Related Art

Conventionally available charging systems for vehicles include systems (for instance, Japanese Patent. Application Publication No. 2006-262570 (JP 2006-262570A)) in which a vehicle-mounted battery that is installed in a vehicle is charged with power supplied from external charging equipment (for instance, a charging stand provided in a gas station or the like, or a commercial power source provided in a residential building). This charging system for vehicles is made up of external charging equipment capable of outputting power to the outside, a vehicle-mounted battery that is charged with power supplied from the outside, and a charging cable that joins the external charging equipment and the vehicle-mounted battery. In this charging system for vehicles, if the external charging equipment is connected to the vehicle-mounted battery via the charging cable; power can be supplied from the external charging equipment to the vehicle-mounted battery via the charging cable, and the vehicle-mounted battery can be accordingly charged.

To charge the vehicle-mounted battery with power supplied from the external charging equipment in this charging system for vehicles, charging communication of transmitting and receiving data relating to charging of the vehicle-mounted battery is performed between the vehicle side and the external charging equipment. The vehicle is provided with a vehicle-mounted electronic control unit that performs control relating to charging of the vehicle-mounted battery. The vehicle-mounted electronic control unit has a modem which is a communication device necessary for performing charging communication with the external charging equipment. The modem can be connected to a power line that is a charging cable through which power is supplied from the external charging equipment to the vehicle-mounted electronic control unit. The modem allows performing charging communication with the external charging equipment using this power line as a medium. The vehicle-mounted electronic control unit permits charging of the vehicle-mounted battery if authentication with the external charging equipment is obtained as a result of the charging communication; on the other hand, charging of the vehicle-mounted battery is stopped if that authentication fails to be obtained or connection with the external charging equipment via the charging cable is released.

In the charging system for vehicles, the modem is supplied with power and started up upon detection that the vehicle side and the external charging equipment are connected via the charging cable. This causes wasteful power consumption since the modem is started up even when no charging communication is performed between the vehicle-mounted electronic control unit and the external charging equipment, in a situation where the vehicle side and the external charging equipment are connected via the charging cable.

In some instances, other predefined functions, which are different from the charging communication function, may be implemented in the vehicle-mounted electronic control unit that has the modem and that performs charging communication with the external charging equipment using the modem. These predefined functions include for instance charging control of the vehicle-mounted battery or door opening/closing detection which may be activated when the ignition of the vehicle is off. In such a configuration, a microcomputer unit of the vehicle-mounted electronic control unit must be started up at a timing at which the charging communication function is not active but the predefined function is active. However, the modem need not be started up since no charging communication with the external charging equipment is performed. Wasteful power is consumed, however, in a case where the entire vehicle-mounted electronic control unit including the modem is started up at the above timing. In particular, there increases the likelihood of battery exhaustion induced through activation of the predefined function when the ignition of the vehicle is off.

SUMMARY OF THE INVENTION

The invention provides a vehicle-mounted charging device and a vehicle charging system that allow preventing a wasteful startup of a modem of a vehicle-mounted electronic control unit in which the modem is used for charging communication.

A first aspect of the invention is a, vehicle-mounted charging device, that is provided with a vehicle-mounted battery, a vehicle-mounted electronic control unit and a modem startup control unit. The vehicle-mounted battery is charged with power supplied from external charging equipment, via a charging cable. The vehicle-mounted battery control unit is configured to perform charging communication, relating to charging of the vehicle-mounted battery, with the external charging equipment using an in-band modem. The modem startup control unit starts up the in-band modem when the vehicle-mounted electronic control unit performs the charging communication, and stops a startup of the in-band modem when the vehicle-mounted electronic control unit does not perform the charging communication.

A second aspect of the invention is a vehicle charging system. The vehicle charging system is provided with a vehicle and an external charging device. The vehicle is equipped with the vehicle-mounted charging device according to the first aspect of the invention. The external charging device has the external charging equipment and the charging cable.

By virtue of the aspects of the invention, the in-band modem in the vehicle-mounted electronic control unit and that is used for charging communication can be prevented from being started up unnecessarily.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Specific embodiments of a vehicle-mounted charging device and a vehicle charging system of the invention will be explained next with reference to accompanying drawings.

Figure 1:
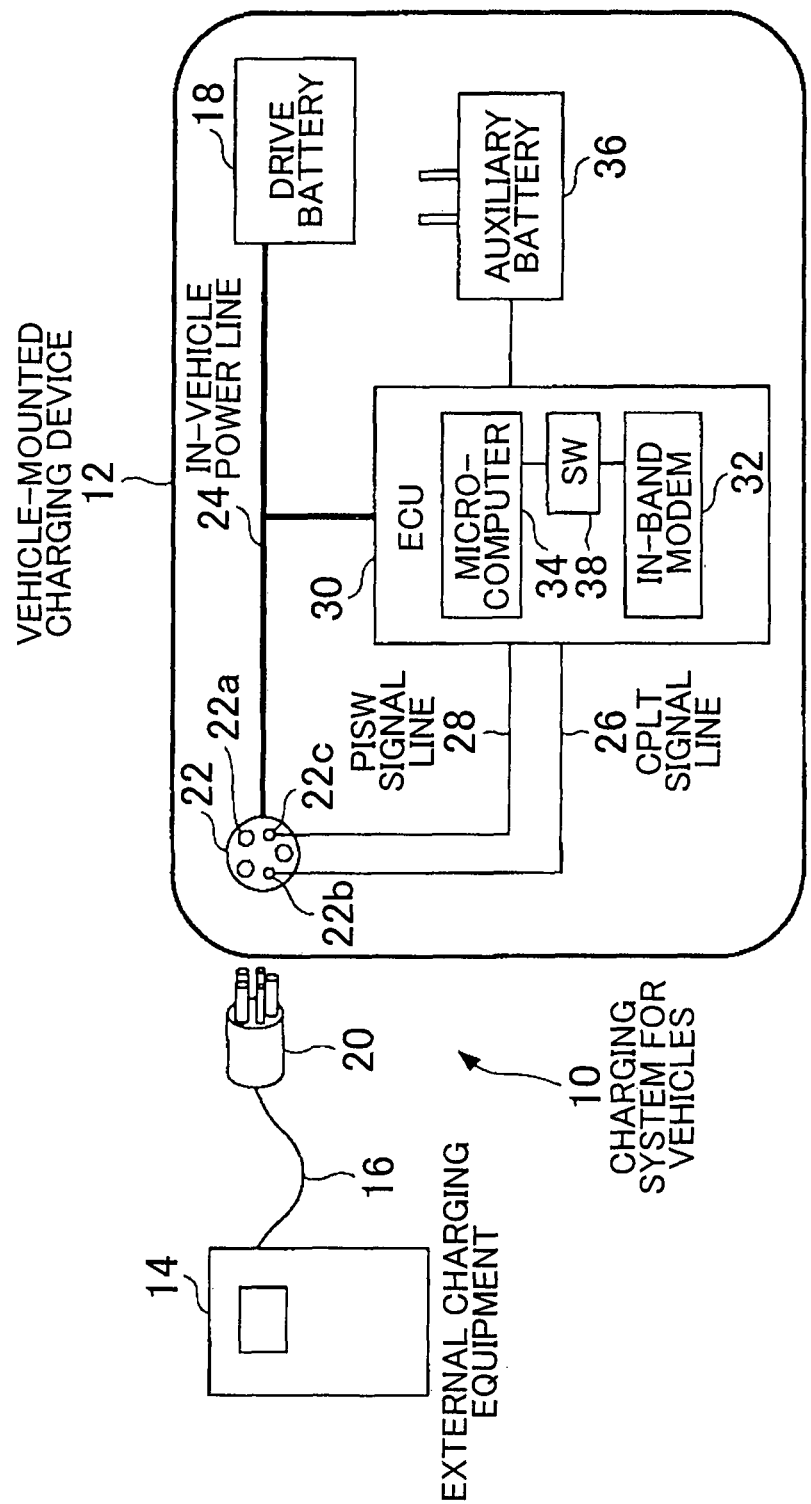
FIG. 1 is a configuration diagram of a vehicle charging system that includes a vehicle-mounted charging device being an embodiment of the invention.

FIG. 1 is a configuration diagram of a vehicle charging system 10 and a vehicle-mounted charging device 12 that are one embodiment of the invention. The vehicle charging system of the present embodiment has a vehicle-mounted charging device 12, external charging equipment (electric vehicle supply, equipment (EVSE)) 14, and a charging cable 16. The charging cable 16 connects the vehicle-mounted charging device 12 and the external charging equipment 14.

The vehicle-mounted charging device 12 is installed in a vehicle that has a drive battery 18. The vehicle-mounted charging device 12 may be regarded as being provided with the drive battery 18. The vehicle is a vehicle in which the drive battery 18 can be charged using the external charging equipment 14, for instance an electric vehicle such as a plug-in vehicle, an electric automobile, a fuel-cell vehicle or the like. The drive battery 18 is a chargeable and dischargeable high-voltage direct current (DC) power source, for instance a secondary battery such as a nickel hydride battery or lithium ion battery. The drive battery 18 can be charged with power supplied by the external charging equipment 14, and can be charged with power generated by a vehicle-mounted generator or the like. In the vehicle, the drive battery 18 can supply power to in-vehicle electric loads that include, for instance, a drive motor that generates driving force.

The external charging equipment 14, which is a charging stand that is disposed in, for instance, a gas station, convenience store, vehicle repair shop, ordinary residential building or the like, is for instance an item of equipment that allows supplying power to a vehicle that is connected to the equipment via a below-described charging cable, using an external power source (for instance, commercial power supply) that is connected via a power outlet. The external charging equipment 14 can generate a control pilot signal (hereafter referred to as CPLT signal) that is a pulse signal of which the state changes periodically (i.e. a duty signal such that both on-time and off-time can change). The external charging equipment 14 can also generate predefined communication data.

The CPLT signal, which is required for performing a charging process from the external charging equipment 14 to the vehicle-mounted charging device 12, is a signal that is transmitted and received to/from a control circuit of the external charging equipment 14 and a control circuit of the vehicle-mounted charging device 12. For instance, the CPLT signal indicates whether or not power is allowed to be supplied from the external charging equipment 14 to the vehicle-mounted charging device 12, and the rated current of the external charging equipment 14. The predefined communication data is data, which relates to the particulars of charging from the external charging equipment 14 to the vehicle-mounted charging device 12, indicates ID data of the person that charges the drive battery 18, the charge amount, the charging fee and the like.

One end of the charging cable 16 is connected to the external charging equipment 14. The charging cable 16 is attached to the external charging equipment 14, and makes up an external charging device integrally with the external charging equipment 14. The charging cable 16 has at least a power line through which power from the external charging equipment 14 flows, and a signal line through which the CPLT signal flows. Through the power line of the charging cable 16, the external charging equipment 14 can supply power for charging the drive battery 18 to the vehicle-mounted charging device 12. Through the signal line of the charging cable 16, the external charging equipment 14 can transmit the generated CPLT signal to the vehicle-mounted charging device 12. The external charging equipment 14 can also transmit predefined communication data, generated as described above, to the vehicle-mounted charging device 12.

A charging connector 20 for connection to the vehicle-mounted charging device 12 is attached to the other end of the charging cable 16. The charging connector 20 has a male connector that includes terminals respectively connected to the power line and the signal line in the charging cable 16. The vehicle-mounted charging device 12 is provided with an outlet 22 configured to connect the charging connector 20 that is attached to the other end of the charging cable 16. The outlet 22 is a female inlet having respective terminals that are provided in a number corresponding to the power line, the signal line and so forth in the charging cable 16.

The outlet 22 is provided, for instance, in the vicinity of a vehicle body site (for instance, at the rear or at a side of the vehicle body) at which the drive battery 18 is disposed. The outlet 22 has a power source terminal 22a, a CPLT terminal 22b and a PISW terminal 22c. The power source terminal 22a can be connected to the power line of the charging cable 16. The CPLT terminal 22b can be connected to the signal line of the charging cable 16. The voltage level of the PISW terminal 22c varies depending on whether or not the charging connector 20 is connected to the outlet 22, i.e. varies depending on whether the vehicle-mounted charging device 12 and the external charging equipment 14 are connected or not via the charging cable 16.

For instance, a sensor, which detects whether or not there is connection between the charging connector 20 that is provided on the charging cable 16 side and the outlet 22 that is provided on the vehicle-mounted charging device 12 side, is connected to the PISW terminal 22c. That is, the sensor detects whether or not the charging connector 20 is inserted in the outlet 22. Low-level voltage appears in the PISW terminal 22c when, for instance, the charging connector 20 is not inserted in the outlet 22 and is thus not connected, and high-level voltage appears in the PISW terminal 22c when the charging connector 20 is connected through insertion in the outlet 22.

The power source terminal 22a of the outlet 22 and the drive battery 18 are connected via an in-vehicle power line 24. Power from the external charging equipment 14, which flows through the power line of the charging cable 16, flows then through the in-vehicle power line 24. Power from the external charging equipment 14 flows through the in-vehicle power line 24 and is supplied to the drive battery 18 after having been converted to desired DC voltage. The power from the external charging equipment 14 which has flown through the in-vehicle power line 24 is converted to DC power, and the drive battery 18 is charged with the DC power.

The vehicle-mounted charging device 12 has an electronic control unit (hereafter, ECU) 30 that is mainly made up of a microcomputer. The ECU 30 has a charging communication function of performing charging communication of transmitting and receiving data relating to charging of the drive battery 18 to/from the external charging equipment 14, and a predefined function other than the charging communication function. The predefined function other than the charging communication function includes a function, for instance, a charging control function of controlling charging of the drive battery 18, a function of detecting and controlling door opening and closing, and/or door locking and unlocking, as well as a function of performing smart verification between the vehicle and a portable device that is carried by the vehicle user. That is, the predefined function other than the charging communication may be regarded as function that may be activated when the ignition of the vehicle is off. The ECU 30 can activate the predefined function if a predefined condition is met at a predefined timing that includes at least when the ignition of the vehicle is off. If the predefined function is a plurality of functions, each function may be configured to be activated in accordance with a respective condition independently established.

The ECU 30 has an in-band modem 32 that is required for performing the charging communication with the external charging equipment 14, and a microcomputer 34 that performs various control processes. The ECU 30 performs the charging communication with the external charging equipment 14 using the in-band modem 32. The ECU 30 can perform various control processes, for instance the charging control function, using the microcomputer 34, and can activate the predefined function without using the in-band modem 32. The in-band modem 32 is a modem for transmission and reception of data, relating to charging of the drive battery 18, to/from the external charging equipment 14, via a communication channel. In order to perform charging communication, for instance, the in-band modem 32 realizes superposition of communication data on the below-described CPLT signal line. The in-band modem 32 is configured to perform wireless radio communication in which data is communicated using audio codecs. That is, the in-band modem 32 may be regarded as communication equipment configured to conduct in-band communication. The in-band communication is communication where the communication data is send via the CPLT signal line.

The ECU 30 receives, at the in-band modem 32, predefined communication data that is transmitted by the external charging equipment 14, and/or transmits, through the in-band modem 32, predefined communication data to be transmitted to the external charging equipment 14, to perform thereby charging communication with the external charging equipment 14. In accordance with the communication data received at the in-band modem 32, the microcomputer 34 of the ECU 30 performs for instance: authenticating whether or not the person that charges the drive battery 18 is the owner, driver or the like of the host vehicle; or a control process of counting or displaying the charging amount and the charging fee, and/or the microcomputer 34 of the ECU 30 generates communication data to be transmitted to the external charging equipment 14 through the in-band modem 32.

The ECU 30 is connected to the in-vehicle power line 24, and can receive power data that flows through the in-vehicle power line 24 i.e. power data that flows through the power line of the charging cable 16, from the external charging equipment 14. The ECU 30 is connected to the CPLT terminal 22b of the outlet 22, via the CPLT signal line 26, and is connected to the PISW terminal 22c of the outlet 22, via the PISW signal line 28.

In the CPLT signal line 26 there flows the CPLT signal from the external charging equipment 14 that flows through the signal line of the charging cable 16. The CPLT signal from the external charging equipment 14 is supplied to the ECU 30 through the CPLT signal line 26. The microcomputer 34 of the ECU 30 determines, on the basis of the state of the CPLT signal line 26, whether the CPLT signal from the external charging equipment 14 is received or not. If the microcomputer 34 determines that the CPLT signal supplied through the CPLT signal line 26 is received, the microcomputer 34 determines, for instance, whether power is to be supplied or not from the external charging equipment 14 to the vehicle, and the rated current of the external charging equipment 14, on the basis of the change in state of the CPLT signal.

A voltage signal (sensor signal) generated at the PISW terminal 22c flows in the PISW signal line 28. The voltage signal is supplied to the ECU 30 through the PISW signal line 28. The microcomputer 34 of the ECU 30 detects, on the basis of the signal state of the PISW signal line 28, the voltage level generated in the PISW terminal 22c. On the basis of the voltage level supplied through the PISW signal line 28, the microcomputer 34 determines whether the charging connector 20 at the other end of the charging cable 16 is inserted in the outlet 22 or not (i.e. whether or not the external charging equipment 14 is connected to the host vehicle-mounted charging device 12 via the charging cable 16).

An auxiliary battery 36 is connected to the ECU 30. The auxiliary battery 36 is a power source necessary for the operation of the ECU 30 (specifically, the microcomputer 34 and the in-band modem 32). Specifically, the auxiliary battery 36 is a power source (for instance, a 12-volt power source) necessary for enabling the ECU 30 to execute the charging communication function with the external charging equipment 14 using the in-band modem 32, as well as various functions that include the above predefined function that can be activated when ignition is off. The auxiliary battery 36 is charged with power supplied from the drive battery 18, or by being supplied with power generated by a vehicle-mounted generator or the like. The auxiliary battery 36 supplies power to the ECU 30 when power is to be supplied to the latter, including times at which the ignition of the vehicle is off. The ECU 30 operates using power supplied by the auxiliary battery 36.

In the ECU 30, the microcomputer 34 has a startup selector switch 38 for selectively switching between a state in which the microcomputer 34 permits supply of power from the auxiliary battery 36 to the in-band modem 32, and a state in which the microcomputer 34 prohibits that power supply. If a predefined condition is met, the microcomputer 34 permits, by way of the startup selector switch 38, supply of power from the auxiliary battery 36 to the in-band modem 32, and starts up thereby the in-band modem 32, as described below. If the predefined condition is not met, the microcomputer 34 prohibits, by way of the startup selector switch 38, the supply of power from the auxiliary battery 36 to the in-band modem 32, and stops thereby a startup of the in-band modem 32.

Figure 2:
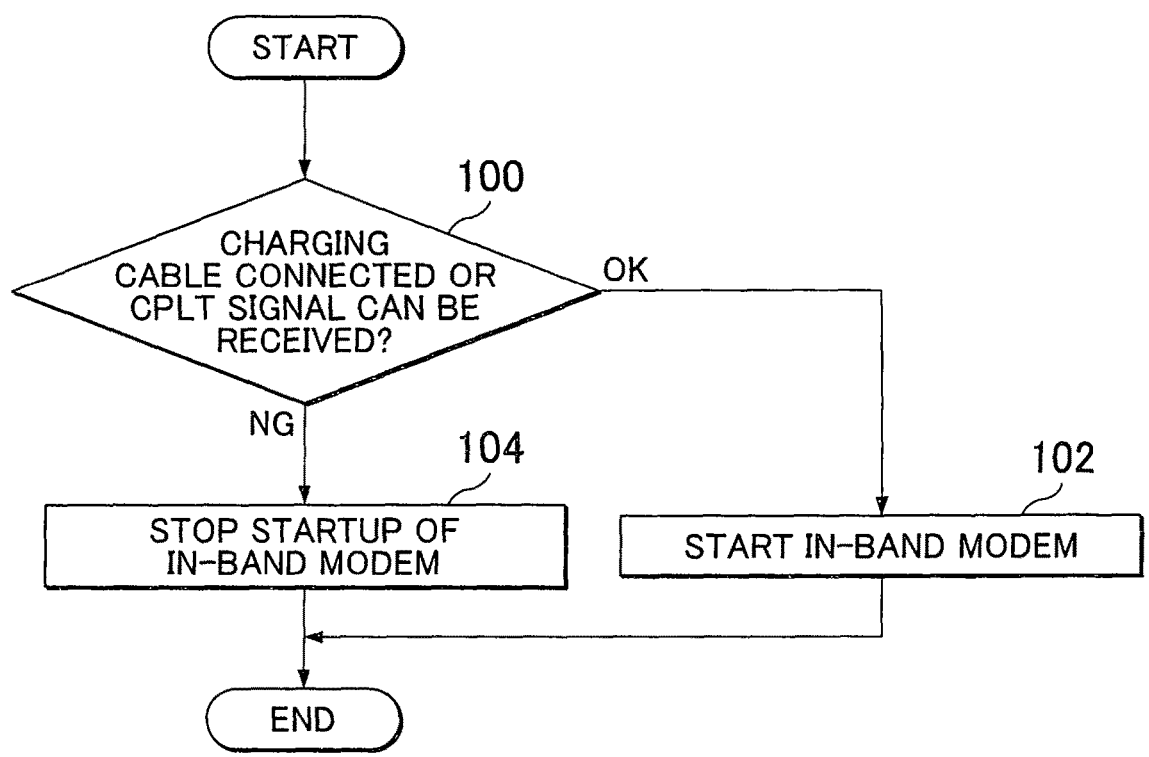
FIG. 2 is a flowchart of an example of a control routine that is executed in a vehicle-mounted charging device of the embodiment.

The operation of the vehicle charging system 10 provided with the vehicle-mounted charging device 12 of the present embodiment will be explained next. FIG. 2 is a flowchart illustrating an example of a control routine that is executed by the microcomputer 34 of the ECU 30 in the vehicle-mounted charging device 12 of the present embodiment.

In the vehicle-mounted charging device 12 of the present embodiment, the microcomputer 34 of the ECU 30 can in principle execute at all times various control processes with power supplied from the auxiliary battery 36. Specifically, the microcomputer 34 can in principle activate at all times, including times at which the ignition of the vehicle is off, the charging communication function and the predefined function (for instance, charging control, door opening/closing detection and so forth) that can be activated when the ignition of the vehicle is off and that is different from the charging communication function.

The microcomputer 34 determines whether the CPLT signal that is supplied by the external charging equipment 14 is received or not within a predefined period, in principle at all times including times at which the ignition of the vehicle is off, and/or detects the voltage level generated in the PISW terminal 22c to determine, on the basis of that voltage level, whether or not the charging connector 20 at the other end of the charging cable 16 is inserted in the outlet 22 (i.e. whether the external charging equipment 14 is connected to the host vehicle-mounted charging device 12 or not via the charging cable 16) (step 100).

The microcomputer 34 determines reception or non-reception of the CPLT signal on the basis of the state of the CPLT signal line 26. Specifically, the microcomputer 34 determines reception or non-reception of the CPLT signal on the basis of whether or not a voltage equal to or higher than a predefined voltage is generated in the CPLT signal line 26, or on the basis of whether or not the voltage generated in the CPLT signal line 26 is a duty signal that changes periodically. The microcomputer 34 determines insertion or non-insertion of the charging connector 20 into the outlet 22 on the basis of the state of the PISW signal line 28. Specifically, the microcomputer 34 determines insertion or non-insertion of the charging connector 20 into the outlet 22 on the basis whether of the voltage generated in the PISW signal line 28 is of high level or of low level. On the basis of the determination result in step 100, the microcomputer 34 determines whether or not charging communication with the external charging equipment 14 using the in-band modem 32 is to be permitted or not.

When the vehicle user desires the drive battery 18 of the vehicle to be charged by the external charging equipment 14, the vehicle user inserts the charging connector 20 at the other end of the charging cable 16, having one end thereof connected to the external charging equipment 14, into the outlet 22 of the vehicle to connect the charging connector 20. The microcomputer 34 determines that the charging communication using the in-band modem 32 is to be permitted if the microcomputer 34 determines that the charging connector 20 at the other end of the charging cable 16 is inserted in the outlet 22, or that the CPLT signal from the external charging equipment 14 has been received. The microcomputer 34 brings the startup selector switch 38 to a state of permitting supply of power from the auxiliary battery 36 to the in-band modem 32; as a result, the in-band modem 32 is started up with power supplied from the auxiliary battery 36 (step 102).

Once started up, the in-band modem 32 can transmit and receive predefined communication data to/from the external charging equipment 14. Charging communication between the ECU 30 and the external charging equipment 14 is enabled as a result. That is, ECU 30 can activate the charging communication function using the in-band modem 32 when the in-band modem 32 is started up.

The microcomputer 34 determines that charging communication that utilizes the in-band modem 32 is not to be permitted, if the microcomputer 34 determines that the charging connector 20 at the other end of the charging cable 16 is not inserted in the outlet 22 and determines that the CPLT signal from the external charging equipment 14 is not received. The microcomputer 34 brings the startup selector switch 38 to a state of prohibiting supply of power from the auxiliary battery 36 to the in-band modem 32; as a result, a startup of the in-band modem 32 with power supplied from the auxiliary battery 36 is stopped (step 104).

When the startup of the in-band modem 32 is stopped, transmitting and receiving predefined communication data to/from the external charging equipment 14 are prohibited. Therefore, charging communication between the ECU 30 and the external charging equipment 14 becomes accordingly impossible. That is, when the startup of the in-band modem 32 is stopped, the ECU 30 does not activate the charging communication function that utilizes the in-band modem 32, since the in-band modem 32 does not receive supply of power from the auxiliary battery 36.

In the vehicle charging system 10 of the present embodiment, thus, charging communication between the microcomputer 34 of the ECU 30 and the external charging equipment 14 is permitted if the charging connector 20 at the other end of the charging cable 16 is inserted in the outlet 22 of the vehicle-mounted charging device 12, or if the ECU 30 receives the CPLT signal from the external charging equipment 14. Then, the microcomputer 34 determines that the charging communication function of performing charging communication is to be activated, and the microcomputer 34 performs power supply from the auxiliary battery 36 to the in-band modem 32 in the ECU 30 so as to start up the in-band modem 32 required for charging communication.

The microcomputer 34 determines that charging communication between the microcomputer 34 of the ECU 30 and the external charging equipment 14 is not to be permitted and that the charging communication function is not to be activated, if the charging connector 20 at the other end of the charging cable 16 is not inserted in the outlet 22 of the vehicle-mounted charging device 12 and the ECU 30 does not receive the CPLT signal from the external charging equipment 14. The microcomputer 34 prohibits supply of power from the auxiliary battery 36 to the in-band modem 32, and stops thereby a startup of the in-band modem 32.

That is, to activate the charging communication function of performing charging communication with the external charging equipment 14, the ECU 30 of the vehicle-mounted charging device 12 starts up the in-band modem 32 through switch-on of the startup selector switch 38. If by contrast the ECU 30 does not activate the charging communication function, the ECU 30 does not start up the entire ECU 30 including the in-band modem 32 so as to stop a startup of the in-band modem 32 through switch-off the startup selector switch 38. Thus, a startup of the in-band modem 32 in the ECU 30 is performed always if the charging communication function is activated, while on the other hand, if the charging communication function is not activated, a startup of the in-band modem 32 is stopped even when, during the ignition off of the vehicle, the microcomputer 34 has activated the predefined function which is different from the charging communication function.

In the vehicle charging system 10 of the present embodiment, thus, supply of power from the auxiliary battery 36 to the in-band modem 32 in the ECU 30, as well as a startup of the in-band modem 32, are not always carried out. The supply of power to the in-band modem 32 and the startup of the in-band modem 32 are carried out only in a case where charging communication between the ECU 30 of the vehicle-mounted charging device 12 and the external charging equipment 14 is performed, i.e. only when the charging communication function is activated in the ECU 30. Therefore, it becomes possible to prevent an unnecessary startup of the in-band modem 32 that is built into the ECU 30 and that is used in the charging communication.

Thus, in the present embodiment, supply of power from the auxiliary battery 36 to the in-band modem 32 is prohibited if the charging communication function is not activated in the ECU 30, in particular even if, when the ignition of the vehicle is off, the predefined function is activated. Therefore, this allows lowering consumption in the auxiliary battery 36, through reduction of unnecessary power consumption caused by a startup of the in-band modem 32, and allows suppressing exhaustion of the auxiliary battery 36.

In particular, the amount of power taken out of the auxiliary battery 36 can be reduced in the vehicle as a whole if it becomes possible to reduce wasteful power consumption that accompanies a startup of the in-band modem 32 when the ignition of the vehicle is off. Accordingly, present embodiment allows further augmenting the electrical components that are supplied with power from the auxiliary battery 36, and allows the vehicle to be equipped with more electrical components.

In the above embodiment, the drive battery 18 may be regarded as the "vehicle-mounted battery" of the invention. The ECU 30 may be regarded as the "vehicle-mounted electronic control unit" of the invention. The "modem startup control unit" of the invention may be regarded as being realized through execution, by the ECU 30, of the process of steps 102, 104 of the routine illustrated in FIG. 2. The "charging communication determination unit" of the invention may be regarded as being realized through execution of the process of step 100.

In the above embodiment, in order to determine whether charging communication, with the use of the in-band modem 32, between the vehicle-mounted charging device 12 and the external charging equipment 14 is to be permitted or not, the microcomputer 34 of the ECU 30 uses both a determination result, based on the state of the CPLT signal line 26, of whether or not the CPLT signal from the external charging equipment 14 is received and a determination result, based on the state of the PISW signal line 28, of whether or not the charging connector 20 at the other end of the charging cable 16 is inserted in the outlet 22. However, the microcomputer 34 may be configured to use either one alone from among these determination results.

In a configuration wherein the microcomputer 34 uses the determination result of whether or not the CPLT signal has been received from the external charging equipment 14, in order to determine whether charging communication, with use of the in-band modem 32, between the external charging equipment 14 and the vehicle-mounted charging device 12 is to be permitted or not, the microcomputer 34 determines, when the ECU 30 does not receive the CPLT signal from the external charging equipment 14, that charging communication in which the in-band modem 32 is utilized is not to be permitted, and then the microcomputer 34 stops a startup of the in-band modem 32 even if the charging connector 20 at the other end of the charging cable 16 had been inserted in the outlet 22. The microcomputer 34 determines that the charging communication is to be permitted, and starts up the in-band modem 32, only when the ECU 30 receives the CPLT signal from the external charging equipment 14. Execution of charging communication, with use of the in-band modem 32, between the vehicle-mounted charging device 12 and the external charging equipment 14 is impossible or difficult unless the ECU 30 receives the CPLT signal. The configuration of the above embodiment allows therefore reducing wasteful power consumption by preventing an useless startup of the in-band modem 32, and allows suppressing exhaustion of the auxiliary battery 36, to a yet greater degree than in a configuration where the in-band modem 32 is started up at all times if the charging connector 20 at the other end of the charging cable 16 is inserted in the outlet 22.

The microcomputer 34 may be configured to use a determination result of whether or not power is supplied from the external charging equipment 14 to the drive battery 18, via the charging cable 16, in order to determine whether the charging communication is to be permitted or not. The microcomputer 34 may determine supply or non-supply of power to the drive battery 18 on the basis of the state of the in-vehicle power line 24, specifically, on the basis of whether or not a voltage equal to or higher than a predefined voltage is generated in the in-vehicle power line 24, or on the basis of whether or not current flows through the in-vehicle power line 24. In this case, the determination result alone of supply or non-supply of power may be used to determine whether charging communication is to be permitted or not; alternatively, the determination result of supply or non-supply of power may be used in combination with the determination result of reception or non-reception of the CPLT signal, and/or with the determination result of insertion or non-insertion of the charging cable 16, described above.

In the determination of whether the charging communication is to be permitted or not, the microcomputer 34 of the ECU 30 in the above embodiment is configured: to perform an affirmative determination if there is met at least either one from among reception of the CPLT signal from the external charging equipment 14 and insertion of the charging connector 20 in the outlet 22; and to perform a negative determination when both the above conditions fail to be met. However, the invention is not limited thereto, and the microcomputer 34 of the ECU 30 in the above embodiment may be configured: to perform an affirmative determination if both conditions are met; and to perform a negative determination if at least either one from among both conditions is not met.

In the configuration of the above embodiment, the charging cable 16 that joins the external charging equipment 14 and the vehicle-mounted charging device 12 is attached to the external charging equipment 14, and makes up an external charging device together with the external charging equipment 14. However, the invention is not limited thereto, and may accommodate a configuration wherein the charging cable 16 is installed on the vehicle side, such that the charging cable 16 is connected to the external charging equipment 14 during charging of the drive battery 18 using the external charging equipment 14.

The invention claimed is:

1. A vehicle-mounted charging device, comprising:
 a vehicle-mounted battery that is charged with power supplied from external charging equipment via a charging cable;
 a vehicle-mounted electronic control unit that includes an in-band modem, a microcomputer, and a startup selector switch, and that is configured to perform charging communication, relating to charging of the vehicle-mounted battery, with the external charging equipment using the in-band modem;
 a modem startup control unit that starts up the in-band modem when the vehicle-mounted electronic control unit performs the charging communication, and that stops a startup of the in-band modem when the vehicle-mounted electronic control unit does not perform the charging communication; and an auxiliary battery configured to supply power to the vehicle-mounted electronic control unit, wherein the microcomputer is configured to determine whether the charging communication that utilizes the in-band modem, between the vehicle-mounted electronic control unit and the external charging equipment, is permitted or prohibited based on a determination of whether or not the external charging equipment is connected via the charging cable and a determination of whether or not a control pilot signal that is supplied from the external charging equipment via the charging cable is received, the microcomputer is configured to determine that the charging communication is permitted, and adjust a state of the startup selector switch based on determining that the charging communication is permitted, the microcomputer is configured to determine that the charging communication is prohibited, and adjust the state of the startup selector switch based on determining that the charging communication is prohibited, the startup selector switch is configured to switch a state of supply of power from the auxiliary battery to the in-band modem between a permitted state and a prohibited state based on the state of the startup selector switch being adjusted by the microcomputer while keeping a state of supply of power from the auxiliary battery to the microcomputer, and the modem startup control unit starts up the in-band modem based on the microcomputer determining that the charging communication is permitted, and stops a startup of the in-band modem based on the microcomputer determining that the charging communication is prohibited.

2. The vehicle-mounted charging device according to claim 1, wherein the external charging equipment is connected via the charging cable, and the in-band modem is started up when the control pilot signal is received.

3. The vehicle-mounted charging device according to claim 1, wherein the in-band modem is a modem configured to perform wireless radio communication in which data is communicated using audio codecs.

4. The vehicle-mounted charging device according to claim 1, wherein the vehicle-mounted electronic control unit is further configured to perform, when a vehicle ignition is off, charging control of the vehicle-mounted battery.

5. A vehicle charging system, comprising:

a vehicle that is equipped with the vehicle-mounted charging device according to claim 1; and an external charging device that has the external charging equipment and the charging cable.

6. The vehicle-mounted charging device according to claim 1, wherein the vehicle-mounted electronic control unit is configured to be capable of operating when a vehicle ignition is off, the modem startup control unit stops a startup of the in-band modem even when the vehicle-mounted electronic control unit is operated when the vehicle ignition is off, if the vehicle-mounted electronic control unit does not perform the charging communication, and the electronic control unit is configured to perform a predefined function which is different from the charging communication when the vehicle ignition is off and when the state of the supply of power from the auxiliary battery to the in-band modem is in the prohibited state, wherein the vehicle-mounted electronic control unit is configured to perform, when the vehicle ignition is off, at least one of: a detection of door opening and closing; control of door opening and closing; a detection of door locking and unlocking; control of door locking and unlocking; and smart verification between a vehicle on which the vehicle-mounted charging device is mounted and a portable device that is carried by a vehicle user.

* * * * *